Feb. 7, 1933.  B. C. PLACE  1,896,590
FASTENER
Filed March 12, 1930
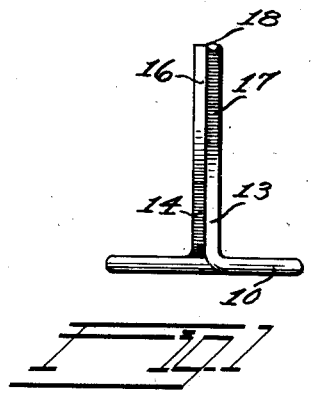
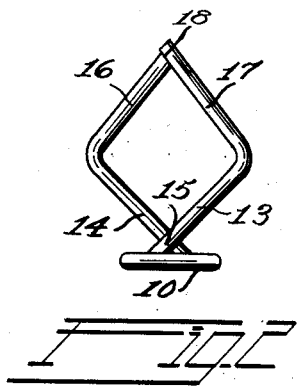
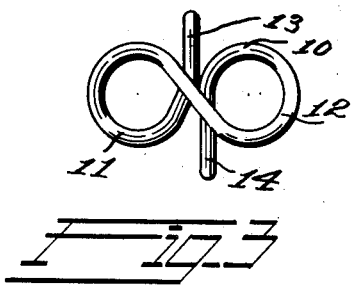
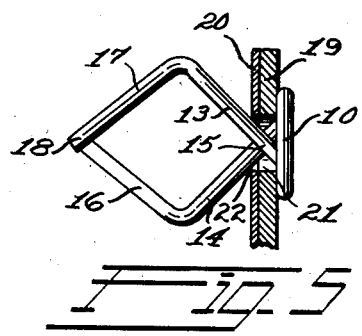
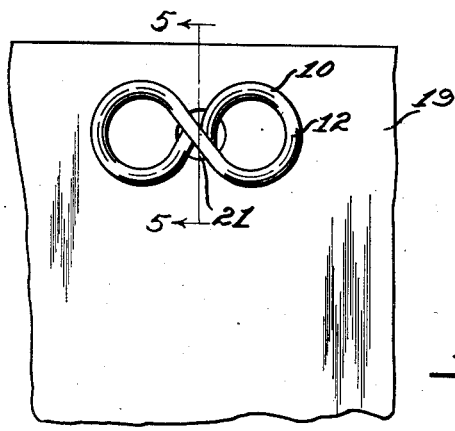
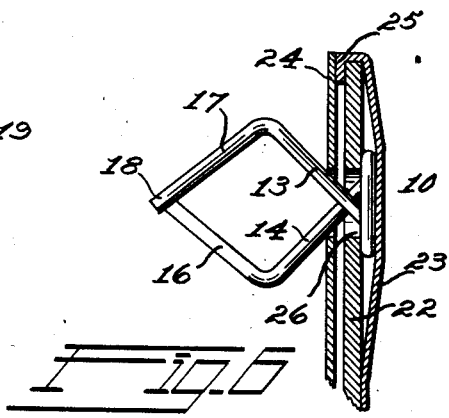
Inventor
Bion C Place
By
Strauch + Hoffman
Attorneys Patented Feb. 7, 1933

1,896,590

UNITED STATES PATENT OFFICE

BION C. PLACE, OF DETROIT, MICHIGAN, ASSIGNOR OF ONE-HALF TO GEORGE E. GAGNIER, OF DETROIT, MICHIGAN

FASTENER

Application filed March 12, 1930. Serial No. 435,319.

This invention relates to a novel one-piece spring wire fastener intended particularly for securing finish material to automobile, aeroplane or similar bodies, though it should be understood that the fastener may be used as an upholster fastener in many other relations in which it is necessary that a fastener be provided to secure material to a foundation of supporting structure the rear of which is inaccessible for the application of nuts, cotter pins, and the like.

This invention constitutes an improvement on the fastener disclosed in my Patent #1,679,266, granted July 31st, 1928, which patent discloses a one-piece spring wire fastener intended for the purposes above alluded to. The invention aims to provide a fastener that may be more readily manufactured in automatic machinery than the fastener of my patent just referred to, and that has fewer relatively sharp bends that might result in breakage of the fastener at the points at which it is thus sharply bent. This invention also aims to provide a fastener having a head that has a relatively large and symmetrical shape that is so formed as to permit the fastener to be applied close to the edge of the panel that it holds in place.

The primary object of the invention, accordingly, is to provide a one-piece wire spring fastener, that is complete in itself, that is constructed of a wire bent to form a head and holding elements of the fastener, in which the bends in the wire are made on curves or on relatively wide angles.

A further object of the invention is to provide a one-piece wire fastener constructed of a relatively stiff piece of spring wire in such form that it may be readily manufactured by automatic machinery with a minimum of liability of breakage of the wire.

A still further object of the invention is to provide a fastener having a head in the form of two substantially closed loops, and embodying a pair of holding arms that are normally divergent, the arms being attached to the several loops in such manner that the inherent resilience in the links is utilized to supplement the resilience of the metal constituting the arms in maintaining said arms in operative holding position.

Still further objects of the invention will appear as a description thereof proceeds with reference to the accompanying drawing in which:

Figure 1 is a side elevation of the improved fastener of the invention.
Figure 2 is a side elevation taken from an end of the head of the fastener.
Figure 3 is a plan view of the fastener.
Figure 4 shows an application of the fastener shown in Figure 3.
Figure 5 is a sectional view taken on the plane indicated by the line 5—5 in Figure 4.
Figure 6 is a sectional view similar to Figure 5, showing a modified arrangement of an applied fastener.

Like reference characters indicate like parts throughout the several figures.

The fastener of this invention is constructed of a single piece of wire of round or any suitable form in cross section, which wire is bent between its ends to form a head 10. The mid-portion of the wire is bent to form a letter S with nicely rounded curves, and the ends are brought toward the center thereof to form two substantially closed loops 11 and 12 disposed side by side in substantially the same plane. Inasmuch as the wire is relatively stiff it is desirable to make all of the bends gradually on wide angles to avoid relatively sharp angles. The loops 11 and 12 are so formed.

The ends of the wire are utilized to form the resilient holding portions of the fastener, as well as the means to guide the fastener to operative position and cause the divergent holding elements to be brought into substantial alignment when the fastener is inserted in an opening as hereinafter described. To this end the ends of the wire are bent into planes that are normal to the plane of the head, or substantially normal thereto. In order to avoid the introduction of sharp bends one end of the wire is bent generally in the direction tangent to the loop that is formed by the portion of the wire adjacent that end. In other words, the end 13 of the wire and loop 11 is carried inwardly away from the head, but in a direction generally tangential to the loop 11, as illustrated at 13 in the drawing. Similarly the end 14 of the wire forming loop 12 is carried forwardly tangentially to said loop and is bent inwardly at an obtuse angle in a plane normal to the loop.

The portions 12 and 14 accordingly diverge from each other and cross each other, as indicated at 15. The ends of the wire are then bent toward each other to form converging guiding portions 16 and 17, said portions being brought to a point 18, at which the end 17 laps the end 16.

It will be observed that the fastener thus provided has a head which is in the form of the figure 8, providing two loops, and that holding elements extend inwardly from the plane of the head, one of the holding elements being carried by one of the loops, while the other is carried by the other loop and that said holding elements are normally divergent in planes normal to the head. It will be observed further that, when these diverging holding elements are forced towards each other, they have a tendency to open the loops and that such action is resisted by the inherent resilience of the wire constituting the loops of the head.

The wire used in forming the fastener just described is of a character that is suitable to be tempered, or otherwise treated, so that it will have the quality of a spring, whereby the various portions of the fastener individually have a relatively great inherent tendency to return to their original positions when sprung therefrom. It will be clear therefore that the arms 13 and 14 have an inherent tendency to return to their original position, and that this action is supplemented by the loops 11 and 12 that serve to supplement the resilience of the arms 13 and 14.

The fastener just described may be applied in numerous situations in the manner above indicated. It has been found to be especially useful in securing the finish panels to the interior of an automobile or similar body, or in securing trim material to said body. Several applications of the fastener in this relation are illustrated in the drawing. In Figures 4 and 5 it is used as a through fastener to secure a perforated panel to a perforated metallic supporting structure. In these figures, the numeral 19 designates a panel, such as a trim panel of any character and the numeral 20 designates a suitable supporting structure as a portion of the sheet metal frame of an automobile body. The trim panel 19 is provided with a perforation 21 and the supporting structure is provided with a perforation 22. In the use of the fastener it is inserted in the perforation 21 in the panel. This is readily accomplished by applying pressure to the head of the fastener after the point 18 thereof is inserted in the perforation 21 therein. The application of said pressure serves to cause the converging of portions 16 and 17 of the fastener to engage the sides of the opening of a perforation 21 causing the diverging holding portions 13 and 14 to be brought together permitting the fastener to enter the perforation. As the pressure on the head is continued the fastener enters into the head thereof and bears against the outer surface of the panel, and the holding portions separate and resume their former diverging relation.

The fasteners may be applied to the panel in this manner before said panel is applied to the supporting structure. If this procedure is followed the panel with the fasteners applied thereto is simply brought into position opposite the supporting structure and the tip of the fastener 18 is then inserted in the perforation 23 in the supporting structure, and the fastener and the panel carried thereby is applied to the structure in the manner just described with reference to the application of the fastener to the panel. The diverging portions again spring apart and engage the relatively sharp edges of the perforation 22 and serve to maintain the panel yieldingly in contact with said supporting structure by the wedging action thus set up.

Figure 6 illustrates another way of using the fastener of this application. In this figure, the trim panel consists of a body 22 which may be of fibrous or other convenient character and suitable cloth or fabric cover 23, the edge of which laps the body when the panel is in position between the supporting structure 24, as indicated at 25. In this form of the invention the fastener may be applied to the body 22 before the cover 23 is attached thereto in any suitable way. For example, the cover 23 may be first applied to the foundation body 22 and the fastener may then be inserted through a specially formed slot in the body from a position to the rear of said body, after the manner described in my Patent #1,722,944 granted July 30, 1929. The fastener may be applied in many other relations, those shown on the drawing being intended merely as examples.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. A spring fastener complete in itself and formed from stiff wire comprising a head in the form of a pair of separate substantially closed loops disposed in substantially the same plane in closely arranged side by side relation, a pair of holding elements in the form of arms disposed in planes substantially normal to the plane of said head and in divergent relation to each other so that when the arms are sprung in an opening or socket they will engage the walls thereof, each holding element being carried by one of said loops so that the inherent resilience in each loop maintains the holding element carried thereby in its divergent relation to the other of said elements.

2. A one-piece wire spring fastener complete in itself, comprising a relatively stiff wire bent between its ends in the form of a figure 8, the ends of said wire being bent into planes substantially normal to the plane of said figure 8 to form the arms that are disposed in divergent relation substantially opposite the center of said figure so that said arms may be sprung into an opening or socket to hold the fastener in position.

3. A one-piece wire spring fastener complete in itself, comprising a head formed by bending the mid-portion of the relatively stiff wire in the form of a pair of separate substantially closed loops, a pair of holding elements in the form of arms disposed in planes substantially normal to said head, and in divergent relation to each other, each holding element being carried by one of said loops so that the inherent resilience in each loop maintains the holding element carried thereby in diverging relation to the other of said elements and in firm engagement with the walls of a socket in which said elements may be sprung.

4. A one-piece spring fastener formed of relatively stiff wire consisting of a head bent in the form of a figure 8 and a pair of holding arms normally disposed in divergent relation in planes normal to the plane of said head and arranged to snappingly engage the walls of an opening or socket, said arms being each carried by one of the loops forming said figure 8.

5. A one-piece spring fastener formed of relatively stiff wire, consisting of a head bent in the form of a figure 8, the ends of the wire adjacent the center of said figure 8 being bent into planes normal to the plane of said head to provide a pair of arms that cross each other adjacent the plane of said head, and then diverge substantially outwardly to form holding arms that are arranged to snappingly engage the walls of an opening or socket, said arms being each carried by one of the loops forming said figure 8.

6. A one-piece wire spring fastener consisting of a head formed by bending the wire between its ends into the form of two loops disposed side by side the ends of the wire being then brought together between the loops and bent into planes at right angles to the plane of the head and laterally of said loops so as to form divergently disposed straight holding arms arranged to engage opposite sides of a socket or opening in which they are sprung, said arms being maintained in diverging relation separately by the inherent resilience of the portions of the wire constituting said loops.

7. A one-piece wire spring fastener complete in itself consisting of a head in the form of a pair of loops and a pair of straight stiff holding arms each of which is carried by one of said loops, said arms being arranged so as to cross each other adjacent the head and then diverge outwardly so as to engage opposite sides of an opening or socket in which they are sprung.

In testimony whereof I affix my signature.
BION C. PLACE.